(12) United States Patent
Stein et al.

(10) Patent No.: US 11,165,770 B1
(45) Date of Patent: Nov. 2, 2021

(54) BIOMETRIC VERIFICATION OF A HUMAN INTERNET USER

(71) Applicant: A10 NETWORKS, INC., San Jose, CA (US)

(72) Inventors: Hilik Stein, Ramat Hasharon (IL); Michael Thompson, Morgan Hill, CA (US)

(73) Assignee: A10 Networks, Inc., San Jose, CA (US)

( * ) Notice: Subject to any disclaimer, the term of this patent is extended or adjusted under 35 U.S.C. 154(b) by 364 days.

(21) Appl. No.: 14/099,722

(22) Filed: Dec. 6, 2013

(51) Int. Cl.
*G06F 12/14* (2006.01)
*H04L 9/32* (2006.01)
*G06F 21/31* (2013.01)
*H04L 29/06* (2006.01)

(52) U.S. Cl.
CPC ........ *H04L 63/0861* (2013.01); *G06F 21/316* (2013.01)

(58) Field of Classification Search
CPC ......... H04L 63/0861; G06F 2221/2133; G06F 1/3231
See application file for complete search history.

(56) References Cited

U.S. PATENT DOCUMENTS

| | | |
|---|---|---|
| 5,541,994 A | 7/1996 | Tomko et al. |
| 5,712,912 A | 1/1998 | Tomko et al. |
| 5,737,420 A | 4/1998 | Tomko et al. |
| 5,757,916 A | 5/1998 | MacDoran et al. |
| 5,832,091 A | 11/1998 | Tomko et al. |
| 5,991,408 A | 11/1999 | Pearson et al. |
| 6,035,398 A | 3/2000 | Bjorn |
| 6,167,517 A | 12/2000 | Gilchrist et al. |
| 6,182,146 B1 | 1/2001 | Graham-Cumming, Jr. |
| 6,182,221 B1 | 1/2001 | Hsu et al. |
| 6,219,793 B1 | 4/2001 | Li et al. |
| 6,219,794 B1 | 4/2001 | Soutar et al. |
| 6,310,966 B1 | 10/2001 | Dulude et al. |
| 6,317,834 B1 | 11/2001 | Gennaro et al. |

(Continued)

FOREIGN PATENT DOCUMENTS

| | | |
|---|---|---|
| CN | 1449618 | 10/2003 |
| CN | 1725702 A | 1/2006 |

(Continued)

OTHER PUBLICATIONS

Alex Marandon, "How to build a web widget (using jQuery)—Alex Marandon", Jun. 2010, https://web.archive.org/web/20100623004301/http://alexmarandon.com/articles/web_widget_jquery/.*

(Continued)

*Primary Examiner* — Michael Simitoski
(74) *Attorney, Agent, or Firm* — Keith Kline; The Kline Law Firm PC

(57) ABSTRACT

Provided are methods and systems for biometric verification of a human Internet user. A method for biometric verification of a human Internet user comprises receiving, from a client machine, a web request for a service and environmental parameters associated with the client machine. The method further comprises determining whether the environmental parameters are indicative of the human Internet user. Based on the determination, the service is selectively provided to the client machine in response to the web request.

19 Claims, 5 Drawing Sheets

(56) References Cited

U.S. PATENT DOCUMENTS

| | | | |
|---|---|---|---|
| 6,490,624 B1 | 12/2002 | Sampson et al. | |
| 6,507,912 B1 | 1/2003 | Matyas, Jr. et al. | |
| 6,714,931 B1 | 3/2004 | Papierniak et al. | |
| 6,748,084 B1 | 6/2004 | Gau et al. | |
| 6,901,145 B1 | 5/2005 | Bohannon et al. | |
| 6,950,651 B2 | 9/2005 | Seligmann | |
| 7,095,852 B2 | 8/2006 | Wack et al. | |
| 7,133,916 B2 | 11/2006 | Schunemann | |
| 7,155,514 B1 | 12/2006 | Milford | |
| 7,237,267 B2 | 6/2007 | Rayes et al. | |
| 7,360,237 B2 | 4/2008 | Engle et al. | |
| 7,376,969 B1 | 5/2008 | Njemanze et al. | |
| 7,480,934 B2 | 1/2009 | Chan et al. | |
| 7,484,089 B1 | 1/2009 | Kogen et al. | |
| 7,551,574 B1 | 6/2009 | Peden, II et al. | |
| 7,552,126 B2 | 6/2009 | Chen et al. | |
| 7,613,829 B2 | 11/2009 | Alve | |
| 7,647,635 B2 | 1/2010 | Chen et al. | |
| 7,653,633 B2 | 1/2010 | Villella et al. | |
| 7,716,378 B2 | 5/2010 | Chen et al. | |
| 7,804,956 B2 | 9/2010 | Chang et al. | |
| 7,970,934 B1 | 6/2011 | Patel | |
| 7,979,585 B2 | 7/2011 | Chen et al. | |
| 8,104,091 B2 | 1/2012 | Qin et al. | |
| 8,122,152 B2 | 2/2012 | Chittenden et al. | |
| 8,151,322 B2 | 4/2012 | Chen et al. | |
| 8,191,106 B2 | 5/2012 | Choyi et al. | |
| 8,312,507 B2 | 11/2012 | Chen et al. | |
| 8,423,676 B2 | 4/2013 | Chen et al. | |
| 8,584,199 B1 | 11/2013 | Chen et al. | |
| 8,595,383 B2 | 11/2013 | Chen et al. | |
| 8,595,791 B1 | 11/2013 | Chen et al. | |
| 8,782,751 B2 | 7/2014 | Chen et al. | |
| 8,813,180 B1 | 8/2014 | Chen et al. | |
| 8,826,372 B1 | 9/2014 | Chen et al. | |
| 8,868,765 B1 | 10/2014 | Chen et al. | |
| 9,060,003 B2 | 6/2015 | Wang et al. | |
| 9,076,027 B2 | 7/2015 | Miura et al. | |
| 9,122,853 B2 | 9/2015 | Thompson | |
| 9,184,921 B2* | 11/2015 | Novak | G06F 21/316 |
| 9,202,105 B1* | 12/2015 | Wang | G06Q 20/4014 |
| 9,219,751 B1 | 12/2015 | Chen et al. | |
| 9,253,152 B1 | 2/2016 | Chen et al. | |
| 9,270,705 B1 | 2/2016 | Chen et al. | |
| 9,294,467 B2 | 3/2016 | Wang et al. | |
| 9,344,421 B1 | 5/2016 | Chen et al. | |
| 9,398,011 B2 | 7/2016 | Thompson | |
| 9,830,599 B1* | 11/2017 | Khen | G06Q 20/40 |
| 9,979,747 B2* | 5/2018 | Bailey | H04L 63/1416 |
| 2001/0022558 A1 | 9/2001 | Karr, Jr. et al. | |
| 2002/0036660 A1* | 3/2002 | Adan | G06F 3/03543 |
| | | | 715/802 |
| 2002/0095587 A1 | 7/2002 | Doyle et al. | |
| 2003/0023874 A1 | 1/2003 | Prokupets et al. | |
| 2003/0101349 A1 | 5/2003 | Wang | |
| 2003/0105859 A1 | 6/2003 | Garnett et al. | |
| 2003/0140232 A1 | 7/2003 | De Lanauze | |
| 2003/0140235 A1 | 7/2003 | Immega et al. | |
| 2003/0142122 A1 | 7/2003 | Straut et al. | |
| 2003/0191989 A1 | 10/2003 | O'Sullivan | |
| 2003/0219121 A1 | 11/2003 | van Someren | |
| 2004/0015243 A1 | 1/2004 | Mercredi et al. | |
| 2004/0034784 A1 | 2/2004 | Fedronic et al. | |
| 2004/0049687 A1 | 3/2004 | Orsini et al. | |
| 2004/0059924 A1 | 3/2004 | Soto et al. | |
| 2004/0081173 A1 | 4/2004 | Feather | |
| 2004/0153553 A1 | 8/2004 | Chotkowski et al. | |
| 2004/0167912 A1 | 8/2004 | Tsui et al. | |
| 2004/0194114 A1 | 9/2004 | Spiegel | |
| 2004/0224664 A1 | 11/2004 | Guo | |
| 2004/0242200 A1 | 12/2004 | Maeoka et al. | |
| 2004/0254919 A1 | 12/2004 | Giuseppini | |
| 2004/0260651 A1 | 12/2004 | Chan et al. | |
| 2005/0009520 A1 | 1/2005 | Herrero et al. | |
| 2005/0010930 A1 | 1/2005 | Vaught | |
| 2005/0018618 A1 | 1/2005 | Mualem et al. | |
| 2005/0086502 A1 | 4/2005 | Rayes et al. | |
| 2005/0089048 A1 | 4/2005 | Chittenden et al. | |
| 2005/0108518 A1 | 5/2005 | Pandya | |
| 2005/0114186 A1 | 5/2005 | Heinrich | |
| 2005/0114321 A1 | 5/2005 | DeStefano et al. | |
| 2005/0125276 A1 | 6/2005 | Rusu | |
| 2005/0137981 A1 | 6/2005 | Maes | |
| 2005/0144480 A1 | 6/2005 | Kim et al. | |
| 2005/0182969 A1 | 8/2005 | Ginter et al. | |
| 2005/0204162 A1 | 9/2005 | Rayes et al. | |
| 2005/0283609 A1 | 12/2005 | Langford | |
| 2006/0069687 A1 | 3/2006 | Cui et al. | |
| 2006/0077926 A1 | 4/2006 | Rune | |
| 2006/0083372 A1 | 4/2006 | Chang et al. | |
| 2006/0165226 A1 | 7/2006 | Ernst et al. | |
| 2006/0173977 A1 | 8/2006 | Ho et al. | |
| 2006/0190997 A1 | 8/2006 | Mahajani et al. | |
| 2006/0200441 A1* | 9/2006 | Nagatsuka | H04L 67/22 |
| 2007/0011300 A1 | 1/2007 | Hollebeek et al. | |
| 2007/0032247 A1 | 2/2007 | Shaffer et al. | |
| 2007/0067441 A1 | 3/2007 | Pomerantz | |
| 2007/0067838 A1 | 3/2007 | Bajko | |
| 2007/0121560 A1 | 5/2007 | Edge | |
| 2007/0156919 A1 | 7/2007 | Potti et al. | |
| 2007/0179986 A1 | 8/2007 | Adam | |
| 2007/0180101 A1 | 8/2007 | Chen et al. | |
| 2007/0192849 A1* | 8/2007 | Golle | G06F 21/34 |
| | | | 726/16 |
| 2007/0195791 A1 | 8/2007 | Bosch et al. | |
| 2007/0206746 A1 | 9/2007 | Andreasson et al. | |
| 2007/0234061 A1* | 10/2007 | Teo | G06Q 20/382 |
| | | | 713/178 |
| 2007/0239604 A1* | 10/2007 | O'Connell | G06Q 20/4016 |
| | | | 705/50 |
| 2007/0259673 A1 | 11/2007 | Willars et al. | |
| 2007/0271598 A1 | 11/2007 | Chen et al. | |
| 2007/0282855 A1 | 12/2007 | Chen et al. | |
| 2007/0283141 A1 | 12/2007 | Pollutro et al. | |
| 2007/0288247 A1 | 12/2007 | Mackay | |
| 2007/0294209 A1 | 12/2007 | Strub et al. | |
| 2008/0002684 A1 | 1/2008 | Kumazawa et al. | |
| 2008/0080398 A1 | 4/2008 | Yasuie et al. | |
| 2008/0104276 A1 | 5/2008 | Lahoti et al. | |
| 2008/0109870 A1 | 5/2008 | Sherlock et al. | |
| 2008/0109887 A1 | 5/2008 | Chen et al. | |
| 2008/0130898 A1 | 6/2008 | Holtmanns et al. | |
| 2008/0148167 A1* | 6/2008 | Russak | G06F 9/543 |
| | | | 715/769 |
| 2008/0148357 A1 | 6/2008 | Chen et al. | |
| 2008/0189790 A1* | 8/2008 | Park | G06F 21/83 |
| | | | 726/26 |
| 2008/0229418 A1 | 9/2008 | Chen et al. | |
| 2008/0263626 A1 | 10/2008 | Bainter et al. | |
| 2009/0047952 A1 | 2/2009 | Giaretta et al. | |
| 2009/0113294 A1* | 4/2009 | Sanghavi | G06F 17/211 |
| | | | 715/269 |
| 2009/0213763 A1 | 8/2009 | Dunsmore et al. | |
| 2009/0292924 A1* | 11/2009 | Johnson | G06F 21/316 |
| | | | 713/176 |
| 2009/0299862 A1* | 12/2009 | Fan | G06Q 30/02 |
| | | | 705/14.73 |
| 2010/0100725 A1* | 4/2010 | Ozzie | G06F 21/43 |
| | | | 713/155 |
| 2010/0153544 A1* | 6/2010 | Krassner | G06F 17/2247 |
| | | | 709/224 |
| 2010/0159955 A1 | 6/2010 | Aerrabotu | |
| 2010/0217819 A1 | 8/2010 | Chen et al. | |
| 2010/0235880 A1 | 9/2010 | Chen et al. | |
| 2011/0173280 A1* | 7/2011 | Ishikawa | G06Q 10/107 |
| | | | 709/206 |
| 2011/0239289 A1 | 9/2011 | Wang et al. | |
| 2012/0023558 A1* | 1/2012 | Rafiq | H04L 63/205 |
| | | | 726/6 |
| 2012/0084133 A1* | 4/2012 | Ross | G06F 11/3438 |
| | | | 709/224 |
| 2012/0183270 A1* | 7/2012 | Greenblatt | G06F 21/31 |
| | | | 386/224 |

(56) References Cited

U.S. PATENT DOCUMENTS

| | | | |
|---|---|---|---|
| 2012/0204236 A1 | 8/2012 | Chen et al. | |
| 2012/0216266 A1 | 8/2012 | Wang et al. | |
| 2012/0246737 A1* | 9/2012 | Paxton | G06F 21/316 726/27 |
| 2012/0297190 A1* | 11/2012 | Shen | H04L 63/0815 713/168 |
| 2013/0036342 A1* | 2/2013 | Deo | G06Q 30/02 715/202 |
| 2013/0191908 A1* | 7/2013 | Klein | G06F 21/36 726/18 |
| 2014/0059702 A1 | 2/2014 | Wang et al. | |
| 2014/0082694 A1* | 3/2014 | Sanghavi | G06F 21/31 726/3 |
| 2014/0096272 A1* | 4/2014 | Makofsky | G06F 21/31 726/34 |
| 2014/0143149 A1 | 5/2014 | Aissi | |
| 2014/0196143 A1* | 7/2014 | Fliderman | G06F 21/32 726/19 |
| 2014/0229268 A1* | 8/2014 | Clapp | G06Q 30/0242 705/14.41 |
| 2014/0250538 A1* | 9/2014 | Rapaport | G06F 21/31 726/28 |
| 2014/0333415 A1* | 11/2014 | Kursun | G06F 21/32 340/5.83 |
| 2014/0347479 A1* | 11/2014 | Givon | G06K 9/00342 348/143 |
| 2014/0380424 A1 | 12/2014 | Thompson | |
| 2015/0128236 A1* | 5/2015 | Moscicki | H04L 63/0876 726/7 |
| 2015/0141076 A1 | 5/2015 | Libin et al. | |
| 2015/0312237 A1 | 10/2015 | Wang et al. | |
| 2015/0365410 A1 | 12/2015 | Thompson | |
| 2016/0036778 A1 | 2/2016 | Chen et al. | |
| 2016/0048662 A1* | 2/2016 | Arnoud | G06F 21/31 726/5 |
| 2016/0050233 A1 | 2/2016 | Chen et al. | |
| 2016/0105395 A1 | 4/2016 | Chen et al. | |
| 2016/0105446 A1 | 4/2016 | Chen et al. | |
| 2016/0182456 A1 | 6/2016 | Wang et al. | |
| 2016/0323261 A1 | 11/2016 | Thompson | |
| 2017/0034148 A1* | 2/2017 | Rapaport | G06F 21/31 |

FOREIGN PATENT DOCUMENTS

| | | |
|---|---|---|
| CN | 101094225 A | 12/2007 |
| CN | 101361037 | 2/2009 |
| CN | 101375253 | 2/2009 |
| CN | 102098316 | 6/2011 |
| CN | 102123156 | 7/2011 |
| CN | ZL 200780001795.6 | 7/2011 |
| CN | ZL 200780001775.9 | 9/2011 |
| CN | 102918801 A | 2/2013 |
| CN | ZL2011100683067 | 11/2014 |
| CN | 102098316 B | 9/2015 |
| EP | 1770915 A1 | 4/2007 |
| EP | 1885096 A1 | 2/2008 |
| EP | 2577910 A2 | 4/2013 |
| HK | 1183569 | 12/2013 |
| JP | 2013528330 A | 7/2013 |
| TW | NI175810 | 4/2003 |
| TW | I249314 | 2/2006 |
| WO | 02/21788 | 3/2002 |
| WO | 2008067013 | 6/2008 |
| WO | 2008070248 | 6/2008 |
| WO | WO2011149796 A2 | 12/2011 |
| WO | WO2014209660 | 12/2014 |

OTHER PUBLICATIONS

"How to Create a Rule in Outlook 2003" CreateaRule-Outlook2003. doc 031405 mad.

WFLOGS, Dec. 15, 2002, http://web.archive.org/web/20021205151706/http://www.wallfire.org/wflogs/wflogs.8.html.

Microsoft Windows XP—Filter events in an event log, Jul. 2, 2004, http://web.archive.org/web/20040702070538/http://www.microsoft.com/resources/documentation/windows/xp/all/proddocs/en-us/nt_filteringevents_how_ev.mspx.

The Cable Guy: Windows 2000 Routing and Remote Access Service—Jun. 2001, Jul. 22, 2004, http://web.archive.org/web/20040722111534/http://www.microsoft.com/technet/community/columns/cableguy/cg0601.mspx.

Monrose et al., "Cryptographic Key Generation from Voice," Proceedings of the 2001 IEEE Symposium on Security and Privacy, pp. 202-213, May 2001.

Shamir, "How to share a secret," Communications of the ACM, vol. 22, No. 11, pp. 612-613, Nov. 1979.

Jermyn et al., "The Design and Analysis of Graphical Passwords," Aug. 1999; Usenix; 15 pp.

Soutar et al.; "Biometric Encryption™"; 1999; pp. 1-28.

Duda et al., "Pattern Classification," Second Edition; 2001; pp. 117-121.

Zhang et al.; "Personal Authentication Based on Generalized Symmetric Max Minimal Distance in Subspace;" 2003; IEEE; pp. 245-248.

Okada et al.; "An Optimal Orthonormal System for Discriminant Analysis"; 1985; Pattern Recognition, vol. 18, No. 2; pp. 139-144.

Chang et al.; "Biometrics-Based Cryptographic Key Generation;" 2004; IEEE; 5 pp.

Zhang et al.; "Optimal Thresholding for Key Generation Based on Biometrics;" 2004; IEEE; 5 pp.

\* cited by examiner

BIOMETRIC VERIFICATION OF A HUMAN INTERNET USER

TECHNICAL FIELD

This disclosure relates generally to data processing and, more specifically, to biometric verification of a human Internet user.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

With the development of the Internet, more and more resources and services are available online. A user can use a web browser to access these resources and services. However, the convenience that the Internet brings comes with some security challenges. There are a great number of malicious software programs that imitate valid client requests. Such malicious software can even perform distributed denial of service attacks (DDoS) to make machine or network resources unavailable to their intended users.

In order to address these problems, mitigation techniques have been used to determine whether the client requests are valid. For example, higher level challenge-response type implementations are aimed toward determining the authenticity of a requester. A SYN cookie is a Transmission Control Protocol (TCP) level challenge response aimed towards detecting spoofed attacks. A Hypertext Transfer Protocol (HTTP) 302 redirect is a higher level challenge response aimed at guaranteeing that the generator of a request is indeed capable of parsing basic HTTP responses. Another technique involves JavaScript redirect which is more powerful than HTTP redirect with multiple implementations. Unless the requester is indeed a browser, with a full java interpreter, it will not be able to follow the Java redirect.

The problem with the above techniques is that they do not involve human detection; rather they are browser detection techniques. Today's Internet bots are not implementing attacks over raw sockets; instead they just link with the browser Application Programming Interface (API) library, and so any request coming from the Internet bots is actually passing through a genuine browser library, thus also having inherent support for 302 redirect as well as JavaScript capabilities.

Other known techniques to differentiate legitimate, user-initiated, web requests from spoofed malicious request include a Completely Automated Public Turing test to tell Computers and Humans Apart (CAPTCHA). But the problem with CAPTCHA is that it is very intrusive, complicated to implement for multi-language support, and does not provide the key benefit of DDoS mitigation, which is keeping the site up and running without the legitimate users ever knowing that there is an ongoing attack being mitigated.

Thus, the existing solutions are associated with various disadvantages and more efficient, non-intrusive, transparent methods are desirable.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to biometric verification of a human Internet user. Specifically, a method for biometric verification of a human Internet user includes receiving, from a client machine, a web request for a service. The method further includes receiving environmental parameters associated with the client machine. Upon receiving the environmental parameters, the method proceeds with determining whether the environmental parameters are indicative of the human Internet user. Based on the determination, the service is selectively provided in response to the web request.

According to another approach of the present disclosure, a system for biometric verification of a human Internet user is provided. The system includes a processor. The processor is configured to receive, from a client machine, a web request for a service. The processor is further configured to receive environmental parameters associated with the client machine and determine whether the environmental parameters are indicative of the human Internet user. The system further includes a traffic classification engine. Based on the determination that the environmental parameters are indicative of the human Internet user, the processor selectively provides the service in response to the web request.

In further example embodiments of the present disclosure, the method steps are stored on a machine-readable medium including instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
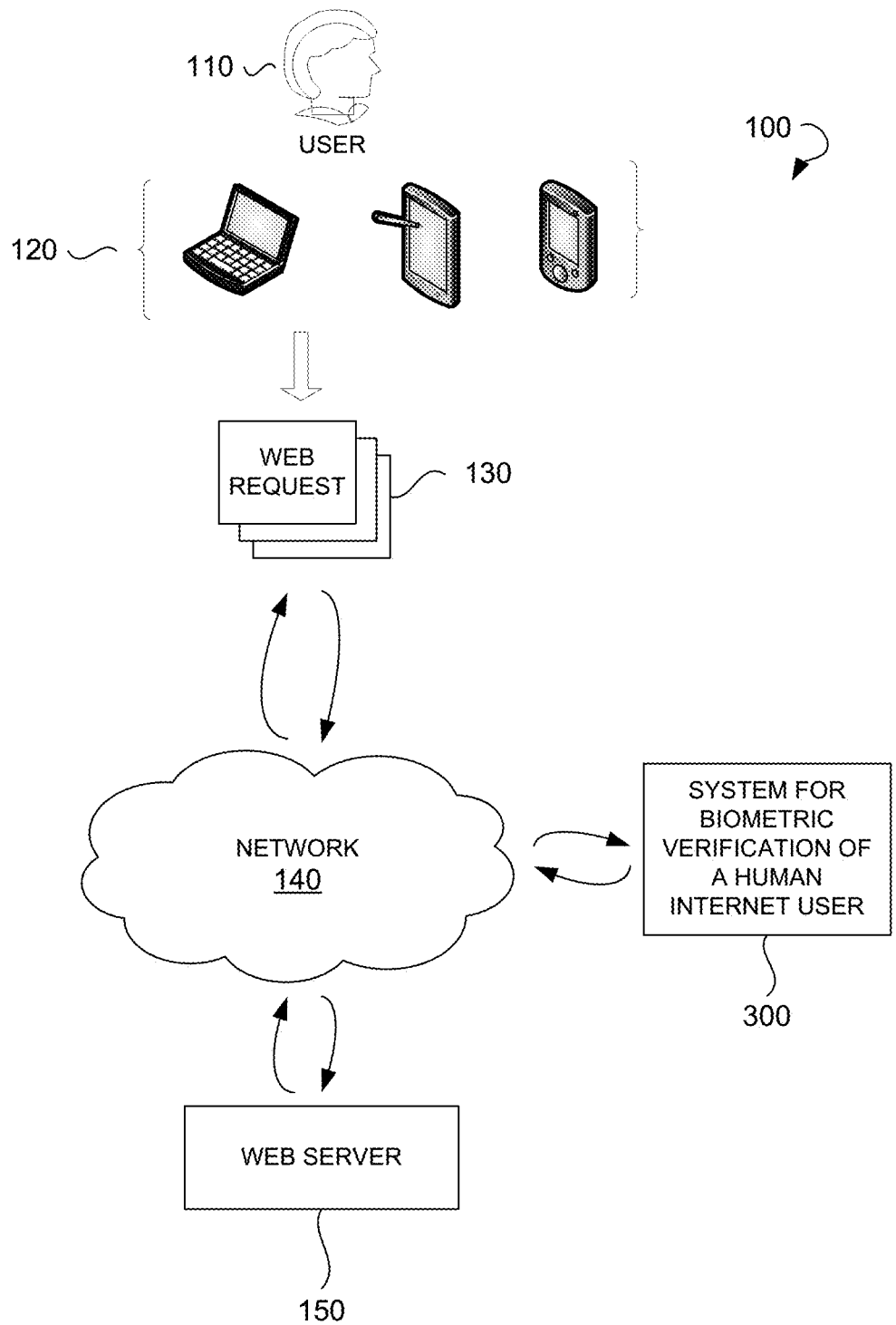
FIG. 1 shows an environment within which methods and systems for biometric verification of a human Internet user are implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed.

The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present technology enables differentiating between legitimate, user-initiated web requests and malicious requests masquerading as legitimate requests. To enable such differentiation, non-intrusive, transparent methods are used to determine whether a human client is initiating the request. The present technology is implemented by obtaining environmental data from the endpoint client machine (this data can be machine-dependent). The environmental data is analyzed for cues indicating whether the request comes from an Internet bot or a human client.

Some embodiments of the present technology allow recording data associated with an input device, such as, for example, a computer mouse. The web browser can send the recorded data to a web server to validate that the data is indicative of a human client. Using the present technology, when a web request for a service is received from a client machine, environmental parameters associated with the client machine are analyzed and a determination is made as to whether a human client is involved. For example, it can be determined whether the web browser is actually running in the foreground, and not merely as a background task. Furthermore, it can be determined whether the web browser has the mouse focus.

Examples of the environmental parameters that can be collected from the client machine include a list of running processes, identity of the process that has an active window handle, mouse movement (human clients tend to move the mouse while waiting for a page to load), keystrokes, and various types of gestures/touches on touchscreen-based devices, as well as information collected from other types of available sensors (for example face detection can be used if a camera is available).

In one example embodiment, the environmental parameters are extracted using an API associated with the client machine. The API is used to determine that a mouse associated with the client machine has a mouse pointer on top of an active window. In certain embodiments, the API is used to access processes associated with the client machine and identify a process that has an active handle, thus determining whether the web page has a focus of the mouse.

In one example embodiment, a script or other executable code is embedded in a webpage being served to the client machine and executed when a browser application gets the focus of the mouse. In one example embodiment, a Macromedia Flash component, such as an ActionScript, can be executed when a browser application gets the focus.

In an alternative embodiment, a Hypertext Markup Language (HTML) frame is inserted into a webpage being served to the client machine, and the mouse movements over the HTML frame are analyzed.

The embodiments disclosed herein can be implemented using a variety of technologies. For example, the methods described herein can be implemented in software executing on a computer system or in hardware utilizing either a combination of microprocessors or other specially designed application-specific integrated circuits (ASICs), programmable logic devices, or various combinations thereof. In particular, the methods described herein can be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

Referring now to the drawings, FIG. 1 illustrates an environment 100 within which methods and systems for biometric verification of a human Internet user can be implemented, according to an example embodiment. The environment 100 can include a user 110 generating a web request 130 to a web server 150. The environment 100 can also include a client machine 120, a network 140 (e.g. the Internet), and a system for biometric verification of a human Internet user 300. The client machine 120 can be coupled through the Internet, or other communication network, to any number of web servers 150 to access, receive, retrieve, and/or display web pages, text, or graphical advertisements, and other information such as audio or video media content.

The network 140 can include the Internet or any other network capable of communicating data between devices. Suitable networks can include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 140 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 140 can include a network of data processing nodes that are interconnected for the purpose of data communication. The network 140 can include a Software-defined Network (SDN). The SDN can include one or more of the above network types. Generally, the network 140 can include a number of similar or dissimilar devices connected together by a transport medium enabling communication between the devices by using a predefined protocol. Those skilled in the art will recognize that the present disclosure can be practiced within a variety of network configuration environments and on a variety of computing devices.

The client machine 120 can include a desktop personal computer (PC), workstation, laptop, personal digital assistant (PDA), cell phone, or any other computing device capable of interfacing directly or indirectly to the Internet.

The client machine can run a browsing program, such as Microsoft's Internet Explorer™ browser, Netscape Navigator™ browser, Mozilla Firefox™ browser, Opera™ browser, or a Wireless Application Protocol (WAP)-enabled browser in the case of a cellphone, PDA, or other wireless device, allowing the user 110 of the client machine to view web pages available from the web servers 150 over the Internet.

The client machine 120 can include one or more user interface devices that are usually manipulated or controlled by a human, such as a keyboard, mouse, touch screen, pen, or the like, for interacting with a graphical user interface (GUI) provided by the web browser on a display (e.g., monitor screen, Liquid-crystal Display LCD display, and so forth), in conjunction with pages, forms, and other information provided by the web server 150. It should be understood that other networks can be used instead of or in addition to the Internet.

Figure 2:
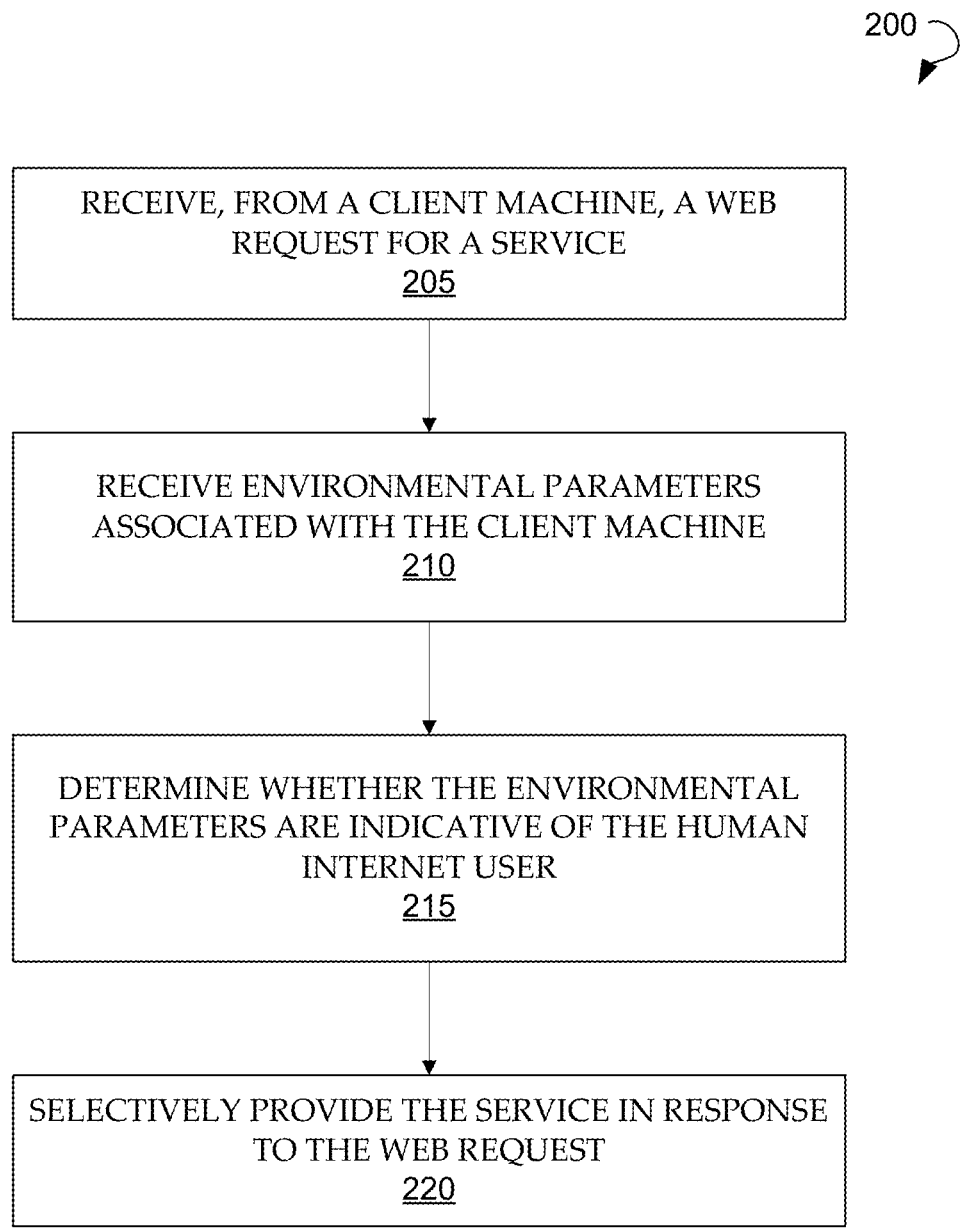
FIG. 2 is a process flow diagram illustrating a method for biometric verification of a human Internet user.

FIG. 2 is a process flow diagram showing a method 200 for biometric verification of a human Internet user, according to an example embodiment. The method 200 can be performed by processing logic that includes hardware (e.g., decision making logic, dedicated logic, programmable logic, and microcode), software (such as software running on a general-purpose computer system or a dedicated machine), or a combination of both.

The method 200 can commence with receiving, from a client machine, a web request for a service at operation 205. At operation 210, environmental parameters associated with the client machine are received. For example, when a user makes a web request, the web browser collects the environmental parameters associated with the user's client machine. The environmental parameters can include mouse movements, keystrokes, and processes running on the client machine. The environmental parameters can be extracted using an API associated with the client machine. For example the API can be used to determine that a mouse associated with the client machine has a mouse pointer on top of an active window. The API can be also used to access processes running on the client machine to identify a process that has an active window handle and determine whether a webpage has the focus of the mouse.

The method 200 can continue with determining whether the environmental parameters are indicative of the human Internet user at operation 215. For example, an active browser window of the client machine, a specific pattern of mouse movement and keystrokes, and/or gestures/touches applied to touchscreen devices can be indicative of the human Internet user.

At operation 220, in response to the web request, the service is selectively provided based on the determination performed in step 215. In an example embodiment, the method 200 can include inserting a HTML frame into a webpage being served to the client machine, capturing mouse movement of a mouse associated with the client machine, and determining that the mouse is moving over the HTML frame In an example embodiment, the method 200 includes providing a biometric challenge to the human Internet user, receiving a response to the biometric challenge and, based on the response, selectively providing the service in response to the web request. The biometric challenge includes a gesture, a touch, a facial expression, and the like. In an example embodiment, the method 200 includes inserting a script into a webpage being served to the client machine, capturing mouse movement of a mouse associated with the client machine, and determining that the mouse is moving over the webpage.

In an example embodiment, the method 200 includes inserting a binary into a webpage being served to the client machine, capturing mouse movement of a mouse associated with the client machine, and determining that the mouse is moving over the webpage. In an example embodiment, the method 200 includes activating a camera associated with the client machine, detecting a face associated with the human Internet user and, based on the detection, selectively providing the service in response to the web request.

Figure 3:
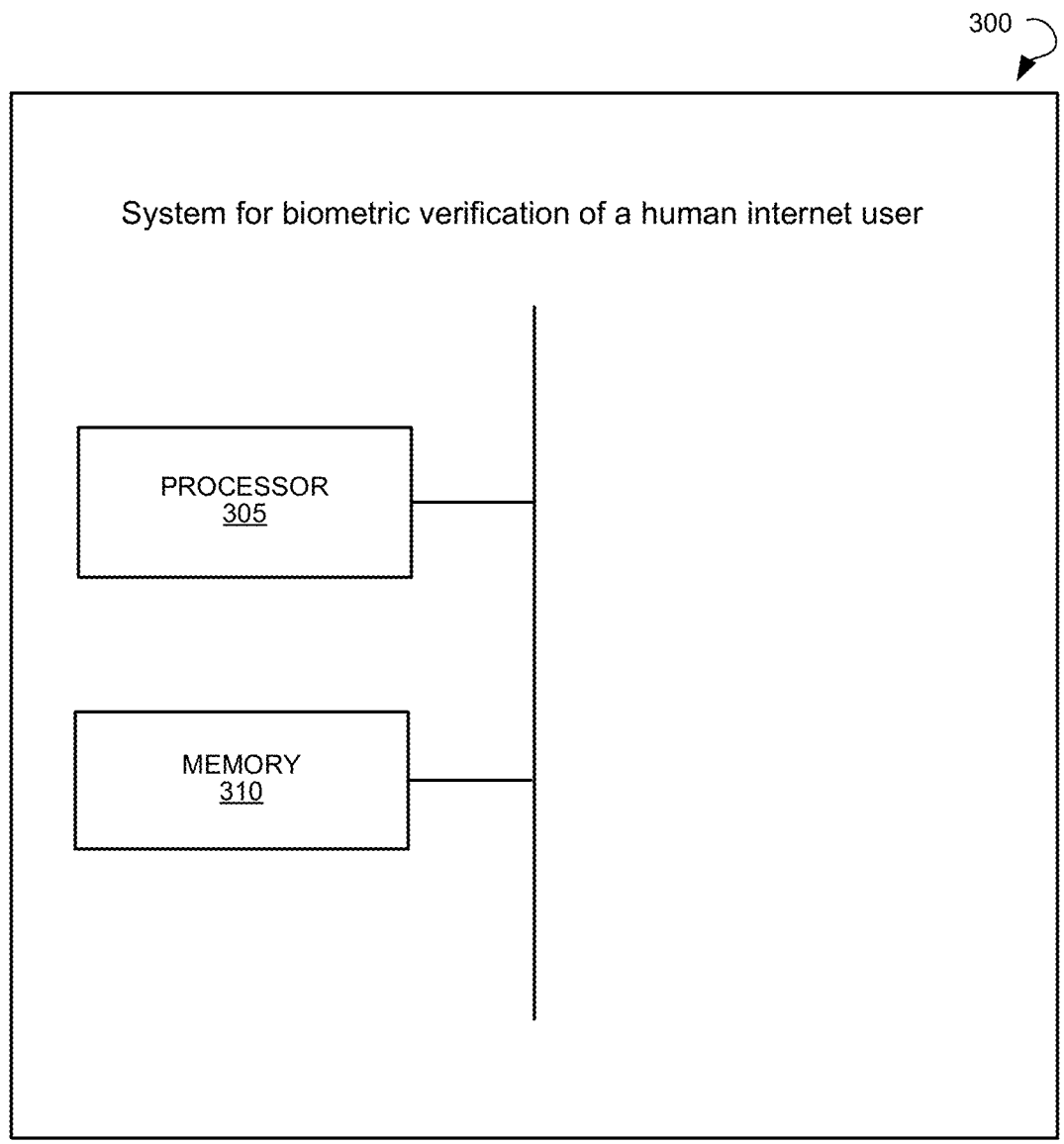
FIG. 3 is a block diagram illustrating various modules of a system for biometric verification of a human Internet user.

FIG. 3 shows a block diagram illustrating various modules of an exemplary system 300 for biometric verification of a human Internet user. Specifically, the system 300 includes a processor 305 and a memory 310. The processor 305 executes instructions for software that are loaded into the memory 310. The processor 305 includes a set of one or more processors or multiple processor cores, depending on the particular implementation. Further, the processor 305 is implemented using one or more heterogeneous processor systems in which a main processor is present with secondary processors on a single chip. In another embodiment, the processor 305 is a homogeneous processor system containing multiple processors of the same type. Instructions for the operating system and applications or programs are located in the memory 310. These instructions are loaded into the memory 310 for execution by the processor 305. The processes of the different embodiments can be performed by the processor 305 using computer-implemented instructions and/or computer-executable instructions, which are located in the memory 310. These instructions can be referred to as program code (e.g., object code and/or source code) that can be read and executed by the processor 305. The program code in the different embodiments can be embodied on different physical or tangible computer readable media.

In one example embodiment, the processor 305 is configured to receive, from a client machine, a web request for a service. The web request can come from an Internet bot or a human Internet user. In one example embodiment, the processor 305 can be further configured to receive environmental parameters associated with the client machine. The environmental parameters can refer to an active browser on the client machine or a mouse pointer on top of an active browser window. The environmental parameters include user operation behavior with respect to a webpage, such as mouse movements, using keyboard for data entry, a process running on the client machine, and so forth. For instance, mouse operation data can include information on coordinates of a cursor, temporal information associated with mouse clicks, and a number of mouse clicks. Keyboard operation data can include key information, key temporal information, and a number of clicks. The environmental parameters can be extracted using an API associated with the client machine.

In one example embodiment, the active browser window is detected by accessing processes associated with the client machine using the API, identifying a process that has an active window handle, and determining whether the webpage has a focus of the mouse. In one example embodiment, the mouse operation is determined by inserting an HTML frame into a webpage being served to the client machine and capturing the movement of the mouse associated with the client machine.

In one example embodiment, the mouse operation is determined by inserting a script into the webpage served to the client machine and capturing the movement of the mouse associated with the client machine. In one example embodiment, the mouse operation is determined by inserting a binary into the webpage served to the client machine and capturing the movement of the mouse associated with the client machine.

In one example embodiment, the processor 305 is further configured to determine whether the environmental parameters are indicative of the human client. The recorded environmental parameters are analyzed to determine whether they are indicative of a behavior associated with a human client. The processor 305 can determine whether the request is indeed generated by a human interacting with an application running on the client machine. Alternatively, the processor 305 can determine that one or more bots are running on the client machine and can ignore requests received from the client machine or discontinue serving the client machine.

Figure 4:
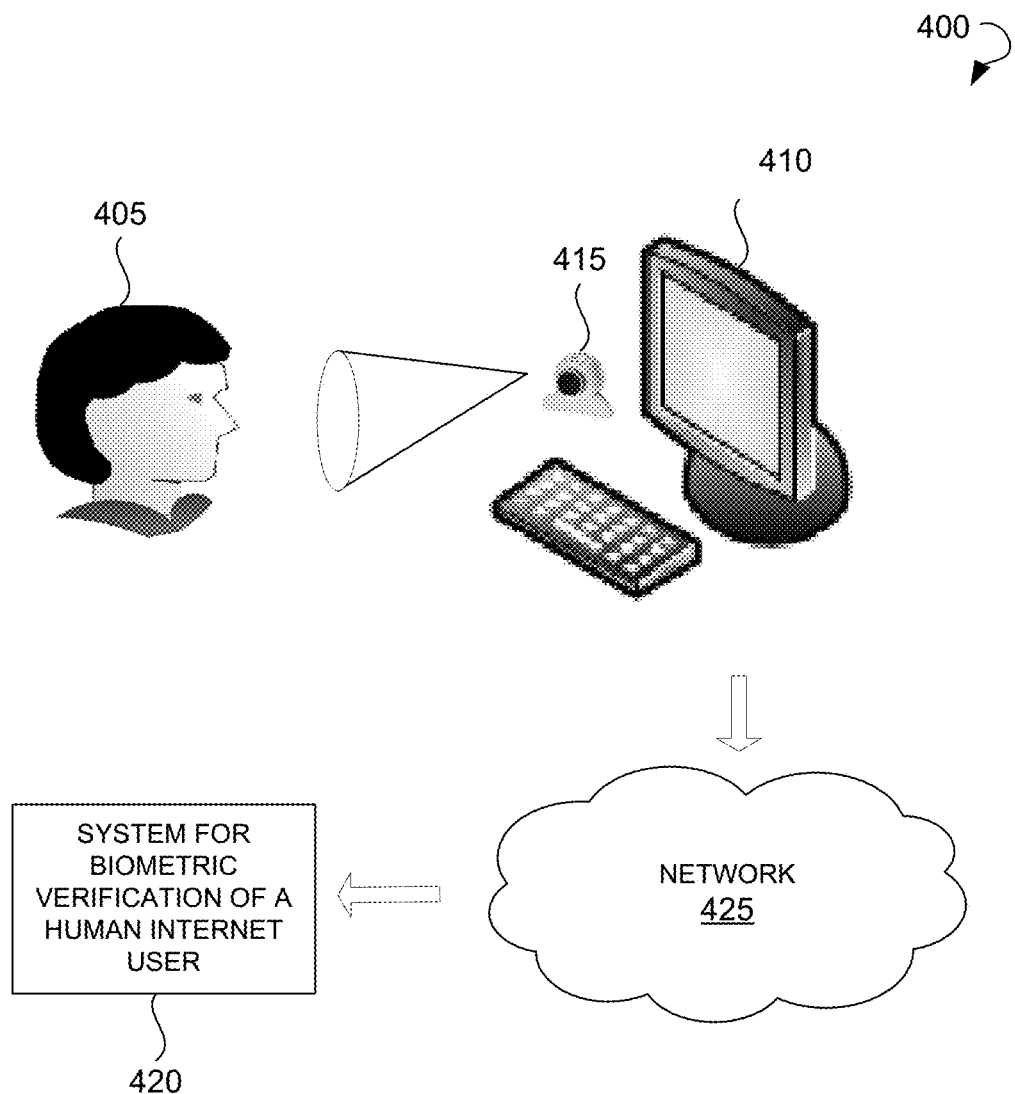
FIG. 4 is a block diagram illustrating biometric verification of a human Internet user.

FIG. 4 shows a scheme 400 for biometric verification of a human Internet user, according to an example embodiment. As shown on FIG. 4, a client machine 410 is equipped with a sensor device 415 such as a web camera. The sensor device 415 is configured to capture images or video of a user 405 of the client machine 410. A captured image or video is analyzed to detect and recognize any face movements or gestures associated with the human Internet user 405. Face detection can be done by various known biometric detection techniques. For example, the detection can be performed based on face movements, such as eye movements, eyebrow movements, mouth and lip movements, head movements, and other such factors. Based on the detection, a service can be selectively provided in response to the web request.

In one example embodiment, the user 405 can be provided with a biometric challenge, such as a gesture, a touch, a facial expression, and the like. For example, the user 405 can be prompted to touch a screen or make a sound. The user 405 can be prompted to perform other actions (for example, smile or frown) to confirm that the user is a human. In one example embodiment, the system for biometric verification of a human Internet user 420 can determine that the user 405 has successfully completed the biometric challenge within a predetermined amount of time.

In one example embodiment, the system for biometric verification of a human Internet user 420 can receive, via a network 425, a response to the biometric challenge, and based on the response, selectively provide the service. In some embodiments, the response can include a notification that a human presence has been verified. In one example embodiment, a determination can be made that no human presence exists.

Figure 5:
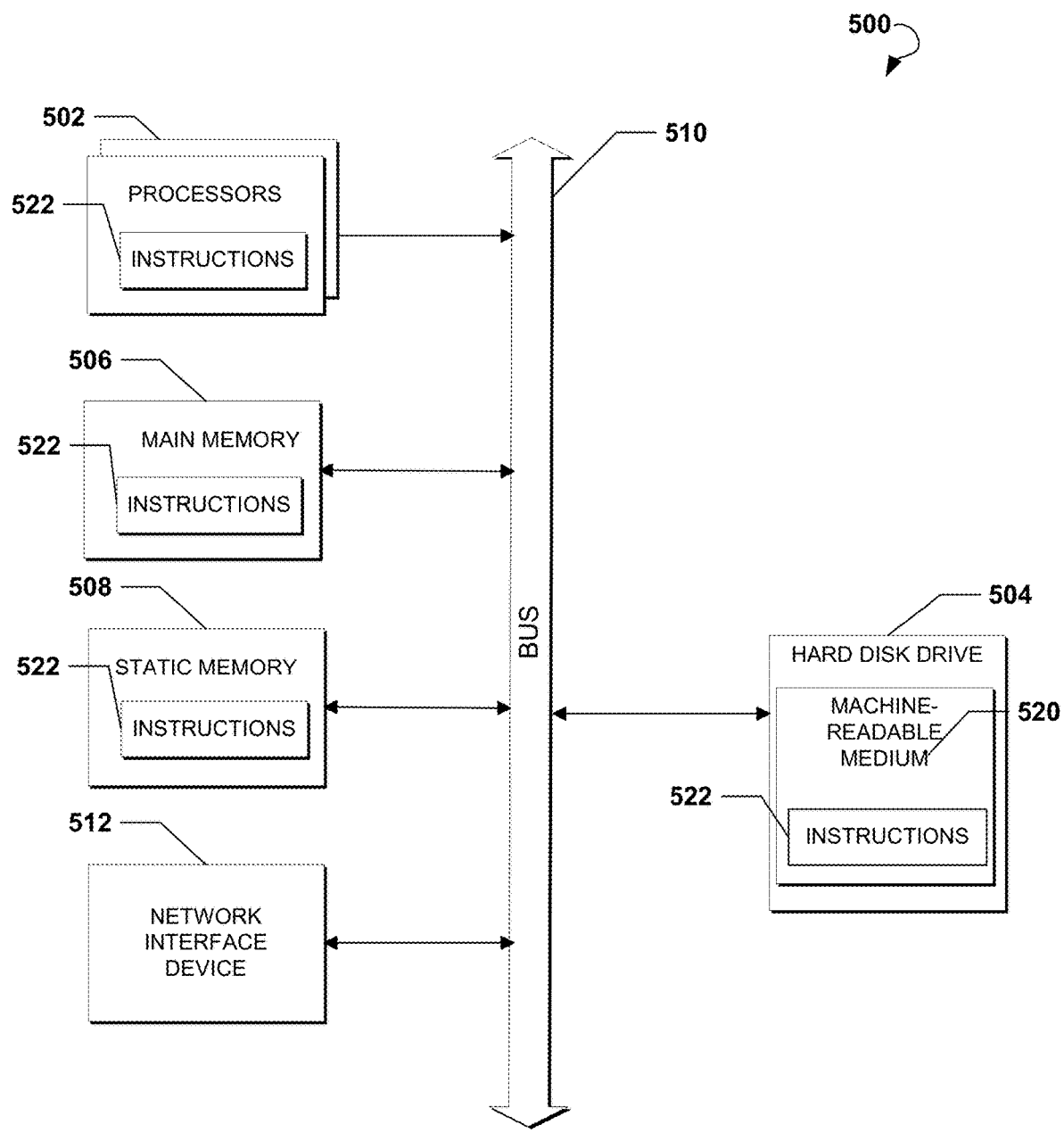
FIG. 5 shows a diagrammatic representation of a computing device for a machine in the example electronic form of a computer system, within which a set of instructions for causing the machine to perform any one or more of the methodologies discussed herein are executed.

FIG. 5 shows a diagrammatic representation of a machine in the example electronic form of a computer system 500, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 506 and a static memory 508, which communicate with each other via a bus 510. The computer system 500 can further include a video display unit 510 (e.g., a LCD or a cathode ray tube (CRT)). The computer system 500 can also include an alphanumeric input device 512 (e.g., a keyboard), a cursor control device 514 (e.g., a mouse), a disk drive unit 504, a signal generation device 528 (e.g., a speaker), and a network interface device 512.

The disk drive unit 504 includes a non-transitory computer-readable medium 520, on which is stored one or more sets of instructions and data structures (e.g., instructions 522) embodying or utilized by any one or more of the methodologies or functions described herein. The instructions 522 can also reside, completely or at least partially, within the main memory 506 and/or within the processors 502 during execution thereof by the computer system 500. The main memory 506 and the processors 502 can also constitute machine-readable media.

The instructions 522 can further be transmitted or received over a network 526 via the network interface device 512 utilizing any one of a number of well-known transfer protocols (e.g., HTTP).

In some embodiments, the computer system 500 can be implemented as a cloud-based computing environment, such as a virtual machine operating within a computing cloud. In other embodiments, the computer system 500 can itself include a cloud-based computing environment, where the functionalities of the computer system 500 are executed in a distributed fashion. Thus, the computer system 500, when configured as a computing cloud, can include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources can be utilized exclusively by their owners, or such systems can be accessible to outside users who deploy applications within the computing infrastructure to obtain the benefit of large computational or storage resources.

The cloud can be formed, for example, by a network of web servers that include a plurality of computing devices, such as the computing device 120, with each server (or at least a plurality thereof) providing processor and/or storage resources. These servers can manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, nonvolatile media, volatile media and transmission media. Nonvolatile media include, for example, optical or magnetic disks, such as a fixed disk. Volatile media include dynamic memory, such as system Random Access Memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a LAN or a WAN, or the connection can be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for biometric verification of a human Internet user are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for biometric verification of a human Internet user, the method comprising:
   receiving, by a processor, from a client machine, a web request for a service, the web request being provided by a user associated with the client machine;
   based on the web request, collecting, by the processor, environmental parameters associated with the client machine, the environmental parameters including at least operational behavior of the user with respect to a browser associated with the client machine, the browser including a webpage presented to the user, the webpage having at least a frame inserted into the webpage, wherein the operational behavior of the user includes at least patterns of actions performed by the user in association with the frame of the webpage by an input device of the client machine, wherein the collecting the environmental parameters includes determining, by an Application Programming Interface (API) associated with the client machine, a list of processes running on the client machine and determining, by the API, based on the list of processes, that a window featuring the browser is a focus of a mouse of the client machine when the user makes the web request;
   extracting, by the processor, from the client machine, data related to operational behavior of the user with respect to the client machine, the data related to the operational behavior of the user with respect to the client machine being recorded by the client machine as patterns of actions performed by the user in association with the input device of the client machine;
   determining, by the processor, whether the environmental parameters and the data related to the operational behavior of the user with respect to the client machine are indicative of the user being the human Internet user;
   wherein the collecting the environmental parameters associated with the client machine further includes:
     determining, by the processor, that a sensor device associated with the client machine to capture an image of the user is available;
     in response to the determination, analyzing, by the processor, the image based on predetermined criteria to detect a face of the user on the image; and based on the detecting, ascertaining, by the processor, a presence of the human Internet user in a proximity to the client machine; and selectively providing the service in response to the web request using the determining and the ascertaining.

2. The computer-implemented method of claim 1, wherein the determination that environmental parameters are indicative of the human Internet user includes determining that the web request is associated with the browser operating in the foreground of the client machine and not as a background task.

3. The computer-implemented method of claim 1, wherein the environmental parameters are extracted using the API associated with the client machine.

4. The computer-implemented method of claim 3, further comprising using the API to determine that the mouse associated with the client machine has a mouse pointer on top of an active window.

5. The computer-implemented method of claim 3, wherein the determining the list of processes includes:
   accessing processes associated with the client machine using the API;
   identifying a process that has an active window handle; and
   determining whether the webpage has the focus of the mouse.

6. The computer-implemented method of claim 1, wherein the predetermined facial expression is a smile.

7. The computer-implemented method of claim 1, wherein the predetermined facial express is a frown.

8. The computer-implemented method of claim 1, further comprising:
   inserting a script into the webpage being served to the client machine;
   capturing mouse movement of the mouse associated with the client machine; and
   determining that the mouse is moving over the webpage.

9. The computer-implemented method of claim 1, wherein the environmental parameters include one or more of a mouse movement and a keystroke on the client machine.

10. The computer-implemented method of claim 1, further comprising:
    inserting a binary into the webpage being served to the client machine;
    capturing mouse movement of the mouse associated with the client machine; and
    determining that the mouse is moving over the webpage.

11. The computer-implemented method of claim 1, wherein the sensor device includes a camera associated with the client machine.

12. A system comprising a processor and a memory, the memory storing instructions, the instructions executable by the processor to perform a method for biometric verification of a human Internet user, the method comprising:
    receiving, from a client machine, a web request for a service, the web request being provided by a user associated with the client machine;
    based on the web request, collecting, environmental parameters associated with the client machine, the environmental parameters including at least operational behavior of the user with respect to a browser associated with the client machine, the browser including a webpage presented to the user, the webpage having at least a frame inserted into the webpage, wherein the operational behavior of the user includes at least patterns of actions performed by the user in association with the frame of the webpage by an input device of the client machine, wherein the collecting the environmental parameters includes determining, by an Application Programming Interface (API) associated with the client machine, a list of processes running on the client machine and determining, by the API, based on the list of processes, that a window featuring the browser is a focus of a mouse of the client machine when the user makes the web request;
    extracting, by the processor, from the client machine, data related to operational behavior of the user with respect to the client machine, the data related to the operational behavior of the user with respect to the client machine being recorded by the client machine as patterns of actions performed by the user in association with the input device of the client machine;
    determining whether the environmental parameters and the data related to the operational behavior of the user with respect to the client machine are indicative of the human Internet user;
    wherein the collecting the environmental parameters associated with the client machine further includes:
       determining that a sensor device associated with the client machine to capture an image of the user is available;
       in response to the determination, analyzing, by the processor, the image based on predetermined criteria to detect a face of the user on the image; and
       based on the detecting, ascertaining a presence of the human Internet user in a proximity to the client machine; and
    selectively providing the service in response to the web request using the determining and the ascertaining.

13. The system of claim 12, wherein the determination that the environmental parameters are indicative of the human Internet user includes determining that the web request is associated with an active browser of the client machine.

14. The system of claim 12, further comprising using the API to determine that the mouse associated with the client machine has a mouse pointer on top of an active window.

15. The system of claim 12, wherein the determining the list of processes includes:
    accessing processes associated with the client machine using the API;
    identifying a process that has an active window handle; and
    determining whether the webpage has the focus of the mouse.

16. The system of claim 12, wherein the predetermined facial expression is at least one of a smile and a frown.

17. The system of claim 12, further comprising:
    inserting a script into the webpage being served to the client machine;
    capturing mouse movement of the mouse associated with the client machine; and
    determining that the mouse is moving over the webpage.

18. A non-transitory computer-readable storage medium having a program embodied thereon, the program being executable by one or more processors to perform a method for biometric verification of a human Internet user, the method comprising:
    receiving, by a processor, from a client machine, a web request for a service, the web request being provided by a user associated with the client machine;
    based on the web request, collecting, by the processor, environmental parameters associated with the client machine, the environmental parameters including at least operational behavior of the user with respect to a browser associated with the client machine, the browser including a webpage presented to the user, the webpage having at least a frame inserted into the webpage, wherein the operational behavior of the user includes at least patterns of actions performed by the user in association with the frame of the webpage by an input device of the client machine, wherein the collecting the environmental parameters includes determining, by an Application Programming Interface (API) associated with the client machine, a list of processes running on the client machine and determining, by the API, based on the list of processes, that a window featuring the browser is a focus of a mouse of the client machine when the user makes the web request;

extracting, by the processor, from the client machine, data related to operational behavior of the user with respect to the client machine, the data related to the operational behavior of the user with respect to the client machine being recorded by the client machine as patterns of actions performed by the user in association with the input device of the client machine;

determining, by the processor, whether the environmental parameters and the data related to the operational behavior of the user with respect to the client machine are indicative of the human Internet user;

wherein the collecting the environmental parameters associated with the client machine further includes:

determining, by the processor, that a sensor device associated with the client machine to capture an image of the user is available;

analyzing, by the processor, the image based on predetermined criteria to detect a face of the user on the image; and based on the detecting, ascertaining, by the processor, a presence of the human Internet user in a proximity to the client machine; and selectively providing, by the processor, the service in response to the web request using the determining and the ascertaining.

19. The computer-implemented method of claim 1, wherein the list of processes includes at least one process running on the client machine.

* * * * *